3,045,038
Patented July 17, 1962

3,045,038
TRIS(1,3,2-OXAZABOROLIDINO)BORAZOLES, TRIS-(BENZO-1,3,2-OXAZABOROLO)BORAZOLES, AND A METHOD FOR THEIR PREPARATION
Robert J. Brotherton, Fullerton, George W. Willcockson, Anaheim, and Howard Steinberg, Fullerton, Calif., assignors to United States Borax & Chemical Corporation, Los Angeles, Calif., a corporation of Nevada
No Drawing. Filed July 22, 1959, Ser. No. 828,703
6 Claims. (Cl. 260—462)

This invention is a continuation-in-part of our invention bearing Serial Number 757,211, filed August 26, 1958, and now abandoned.

This invention relates as indicated to borazoles and their preparation and has particular reference to tris-(1,3,2-oxaazaborolidino)borazoles and tris(benzo-1,3,2-oxaazaborolo)borazoles having N—B—O bonds.

It is therefore an object of this invention to provide a method for the preparation of tris(1,3,2-oxaazaborolidino)borazoles and tris(benzo - 1,3,2 - oxaazaborolo)borazoles.

It is another object of this invention to provide as a new class of chemical compounds the tris(1,3,2-oxaazaborolidino)borazoles and the tris(benzo-1,3,2-oxaazaborolo)borazoles.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises as a new composition of matter a compound selected from the group consisting of tris(1,3,2-oxaazaborolidino)-borazoles and tris(benzo-1,3,2-oxaazaborolo)borazoles represented by the following general formulae:

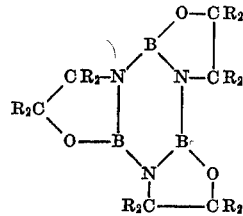

and

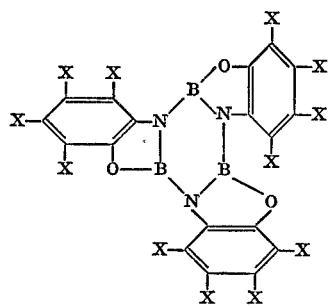

where R is a substituent selected from the group consisting of hydrogen, alkyl radicals of from 1–5 carbon atoms and phenyl radicals and X is a substituent selected from the group consisting of hydrogen, alkyl radicals of from 1–5 carbon atoms, alkoxy radicals of from 1–5 carbon atoms and halogen radicals, said compounds consisting of the reaction products of a boric ester derived from an alcohol having from 1–5 carbon atoms and a material selected from the group consisting of ethanolamines having the general formula

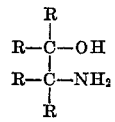

and o-aminophenols having the general formula

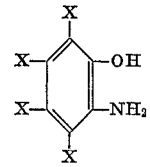

where R is a substituent selected from the group consisting of hydrogen, alkyl radicals of from 1–5 carbon atoms and phenyl radicals and X is a substituent selected from the group consisting of hydrogen, alkyl radicals of from 1–5 carbon atoms, alkoxy radicals of from 1–5 carbon atoms and halogen radicals.

The present borazoles are conveniently prepared by heating the foregoing ingredients under reflux and the reaction may be conducted with equimolar quantities of reactants or an excess of the boric acid ester. Once the reaction has taken place it is immaterial to the present invention how the resultant crude product is separated from the reaction mass and purified. Any of the well-known techniques, such as solvent extraction and crystallization are applicable to the present invention.

It is to be clearly understood that the substituents of the ethanolamine or the o-aminophenol may all be the same or all different and the o-aminophenol may be substituted in any one, or all, or any combination of the 3, 4, 5 and 6 positions.

The following equations are typical examples of the reactions of the present invention:

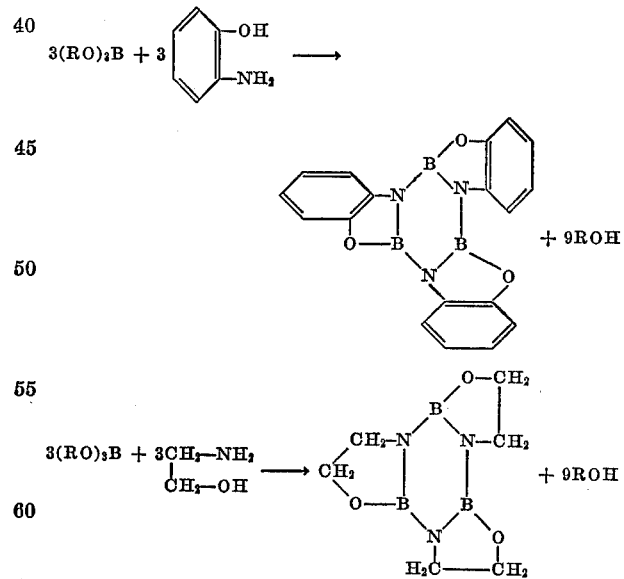

The following comprises an illustrative list of materials which are useful as reactants in producing the present borazoles. It will be readily seen that the following is only a partial enumeration of the substituted ethanolamines and o-aminophenols and the boric acid esters which are applicable to this invention, and it is to be completely understood that it is entirely within the contemplation of this invention to include as reactants all those materials as defined in the above broadly stated paragraph.

(I)

Boric acid esters:
  Trimethyl borate
  Triethyl borate
  Tri-n-propyl borate
  Triisopropyl borate
  Tri-n-butyl borate
  Tri-t-butyl borate
  Tri-n-amyl borate
  Tri-t-amyl borate (II)

Ethanolamines:
  Ethanolamine
  1-amino-2-hydroxpropane
  2-amino-1-hydroxypropane
  2-amino-3-hydroxybutane
  2-amino-2,3-dimethyl-3-hydroxypropane
  1-amino-2-hydroxybutane
  1-amino-2-ethyl-2-hydroxybutane
  1-amino-2-hydroxy-3-methylbutane
  1-amino-2-hydroxyheptane
  1-amino-2-hydroxyphenylethane
  1-amino-1,2-diphenyl-2-hydroxyethane
  2-amino-1-hydroxy-1-phenylhexane
  2-amino-1-hydroxy-2-methyl-3-phenylpropane
  1-amino-3-ethyl-2-hydroxy-2-methylbutane
  2-amino-1-hydroxy-5-phenyl-3-n-propylpentane (III)

o-Aminophenols:
  o-Aminophenol
  2-amino-3-methylphenol
  2-amino-3,4-dimethylphenol
  2-amino-3,4,5-trimethylphenol
  2-amino-3,4,5,6-tetramethylphenol
  2-amino-4-ethylphenol
  2-amino-4,5-diethylphenol
  2-amino-4,5,6-triethylphenol
  2-amino-5-isopropylphenol
  2-amino-4-t-butylphenol
  2-amino-3-chlorophenol
  2-amino-3,4,5-trichlorophenol
  2-amino-3-fluorophenol
  2-amino-3-bromophenol
  2-amino-3-isoproxyphenol
  2-amino-3,4-diethoxyphenol
  2-amino-3,4,5-tri-n-butoxyphenol
  2-amino-3-chloro-4,5-dimethylphenol
  2-amino-4-ethyl-3-methylphenol
  2-amino-3-bromo-4-isopropylphenol
  2-amino-3-methyl-5-methoxyphenol
  2-amino-4-chloro-5-ethoxyphenol
  2-amino-3-bromo-4-methyl-6-n-propoxyphenol So that the present invention is more clearly understood the following examples are given for illustrative purposes:

(I)

Equimolar amounts of o-aminophenol and isopropyl borate were heated in a flask under a fractionating column until substantially all the isopropanol (3 moles per mole of boric acid ester) was evolved (about 16.5 hours). The resulting mass was cooled, filtered and washed with 20–40° petroleum ether. Impurities were removed from the crude product by extraction with benzene, acetone and petroleum ether. The final product had a molecular weight of 338 (theory 351), a chemical analysis of 9.44% B, 60.1% C and 3.52% H, and it decomposed over a range of from 210°–280° C. From the assay it will be seen that the final product conforms to the formula $(C_6H_4NBO)_3$. The infrared spectrum of the material was obtained and was consistent with the structure of the trimer. The material was soluble in ethyl acetate, monoglyme, diglyme, sodium hydroxide and hydrochloric acid; it was slightly soluble in tetrahydrofuran, dioxane and acetone; and was insoluble in benzene, toluene, xylene, ethyl ether, chloroform, acetonitrile, petroleum ether, water and methanol.

(II)

Equimolar quantities of ethanolamine and isopropyl borate were heated in xylene under a fractionating column until substantially all the isopropanol (3 moles per mol of boric acid ester) was evolved. Sublimation of the reaction product at 30 mm. yielded a white crystalline solid. Analysis of the product showed it to have the formula $(CH_2CH_2NBO)_3$.

Since all of the ingredients as defined above undergo substantially identical reactions and require substantially identical techniques, the foregoing examples are considered sufficient to fully illustrate the present invention.

The new compounds of the present invention will be found to be useful as chemical intermediates; they may be used as fuel additives to improve certain properties of aviation and other gasolines as well as providing anti sluding properties for diesel fuel. The present borazoles will also be found to be useful as sizing agents for glass fibers and fabrics and as curing catalysts for accelerating the cure of resins and other curable (or potentially curable) materials. The present compounds can also be used to increase the flame resistance of materials into which they have been incorporated as a coating or impregnant, e.g., paper, wood and textile materials.

Other modes of applying the principle of the invention may be employed, change being made as regards the details described, provided the features stated in any of the following claims or the equivalent of such be employed.

We, therefore, particularly point out and distinctly claim as our invention:

1. A new composition of matter selected from the group consisting of

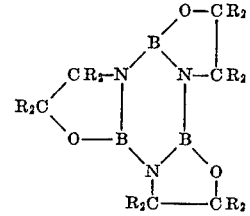

and

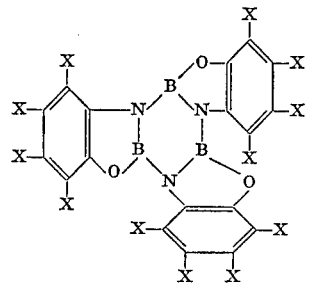

where R is selected from the group consisting of hydrogen, alkyl radicals having from 1–5 carbon atoms and phenyl, and X is selected from the group consisting of hydrogen, alkyl radicals having from 1–5 carbon atoms, alkoxy radicals having from 1–5 carbon atoms, and halogen radicals.

2.

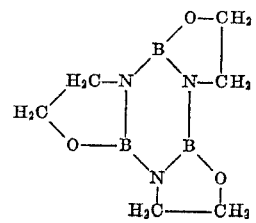

3.

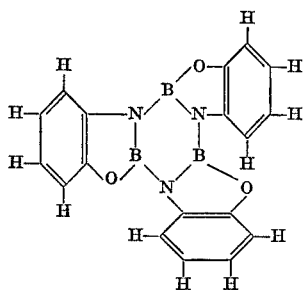

4. The method of producing a compound selected from the group consisting of substituted and unsubstituted tris-(1,3,2-oxaazaborolidino)borazole and substituted and unsubstituted tris(benzo-1,3,2-oxaazaborolo)borazole which comprises heating under reflux a trialkyl boric acid ester the alkyl group having from 1–5 carbon atoms with a material selected from the class consisting of ethanolamines having the formula

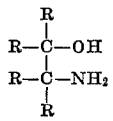

and o-aminophenols having the formula

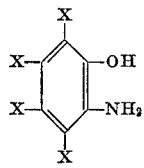

where R is selected from the group consisting of hydrogen, alkyl radicals having from 1–5 carbon atoms and phenyl, and X is selected from the group consisting of hydrogen, alkyl radicals having from 1–5 carbon atoms, alkoxy radicals having from 1–5 carbon atoms, and halogen radicals.

5. The method of producing substituted and unsubstituted tris (1,3,2-oxaazaborolidino)borazole which comprises heating under reflux a trialkyl boric acid ester the alkyl group having from 1–5 carbon atoms with an ethanolamine having the formula

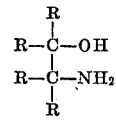

where R is selected from the group consisting of hydrogen, alkyl radicals having from 1–5 carbon atoms and phenyl.

6. The method of producing substituted and unsubstituted tris(benzo-1,3,2 - oxaazaborolo)borazole which comprises heating under reflux a trialkyl boric acid ester the alkyl group having from 1–5 carbon atoms with an o-aminophenol having the formula

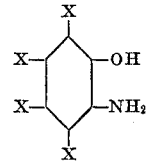

where X is selected from the group consisting of hydrogen, alkyl radicals having from 1–5 carbon atoms, alkoxy radicals having from 1–5 carbon atoms and halogen radicals.

No references cited.